Aug. 16, 1966  W. S. WRIGHT, JR  3,266,335
CONTROL LINE REGULATOR

Filed Feb. 10, 1964  2 Sheets-Sheet 1

INVENTOR.
WILLIAM S. WRIGHT JR
BY
Paul B. Hunter
ATTORNEY

Aug. 16, 1966 W. S. WRIGHT, JR 3,266,335
CONTROL LINE REGULATOR
Filed Feb. 10, 1964 2 Sheets-Sheet 2
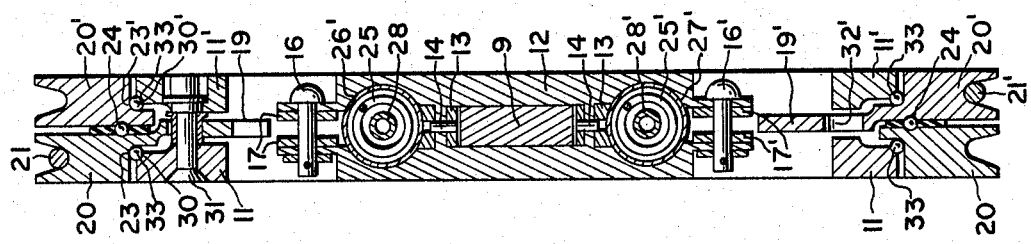
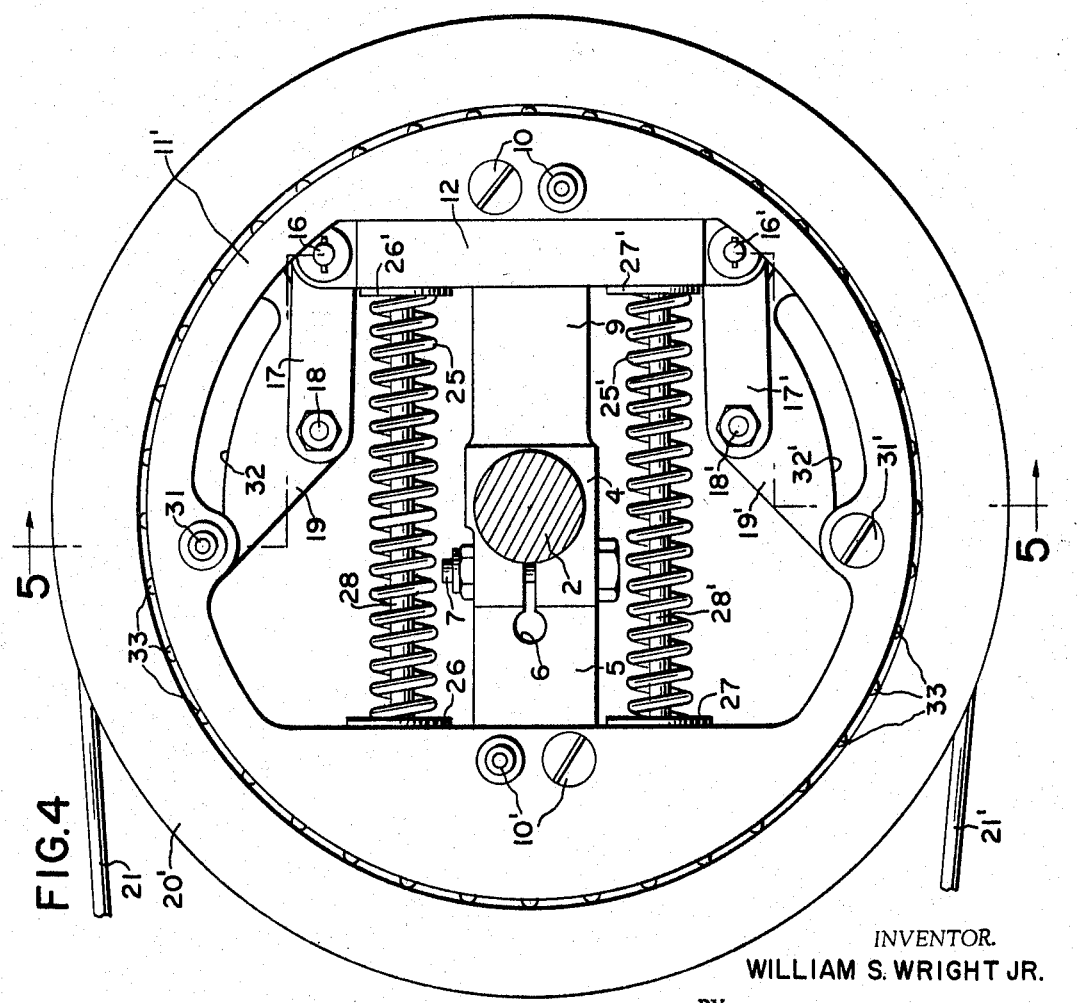
INVENTOR.
WILLIAM S. WRIGHT JR.
BY
Paul B. Hunter
ATTORNEY

# United States Patent Office 3,266,335
Patented August 16, 1966

3,266,335
CONTROL LINE REGULATOR
William S. Wright, Jr., Orange, Calif., assignor to Pacific Scientific Company, San Francisco, Calif., a corporation of California
Filed Feb. 10, 1964, Ser. No. 343,532
2 Claims. (Cl. 74—501.5)

This invention relates generally to control line regulators, and the invention has reference, more particularly, to a novel control line or tension regulator for maintaining uniform tension in control lines extending between controlling and controlled points, such as between an engine throttle and the engine of an aircraft, the said regulator acting automatically to compensate for variations in the length of the control lines resulting from such conditions as temperature changes, airframe deflections, etc.

With the increasing complexity of aircraft and the resulting necessity to crowd more and more equipment into the limited space available, it is essential that aircraft equipment including regulators be made as light and compact as possible and still perform their functions satisfactorily. Heretofore, control line regulators have had their sheave sectors rotatably mounted on a central shaft or trunnions extending outwardly from the regulator body. This structure made the regulators relatively wide and bulky as illustrated in U.S. Patent #2,841,030, Robert J. Wrighton inventor, so that considerable valuable space within the aircraft was occupied by the regulator, and, where a plurality of regulators are used side by side as is customarily the case, the problem becomes critical. Also, since the sheave sector bearings were relatively small, expensive shake free antifriction bearings had to be used.

The principal object of the present invention is to provide a novel control line regulator that is extremely compact and extremely light-weight in structure and wherein the sheave sector ball bearings surround the regulator body and the locking cross-head carried thereby to produce a slim, rugged regulator of minimum dimensions and wherein extreme accuracy of sheave sector bearings is not necessary owing to the large diameter of these bearings.

A feature of the invention is to provide a novel regulator of the above character wherein the compensating action takes place with a minimum of friction, and the locking action, taking place upon a control operation, is positive and reliable in use.

Other features and advantages of this invention will become apparent as the description proceeds taken in connection with the accompanying drawings wherein:

FIG. 4 is a view similar to FIG. 1 but showing the regulator springs fully expanded; and FIG. 5 is a sectional view taken along line 5—5 of FIG. 4.

Figure 2:
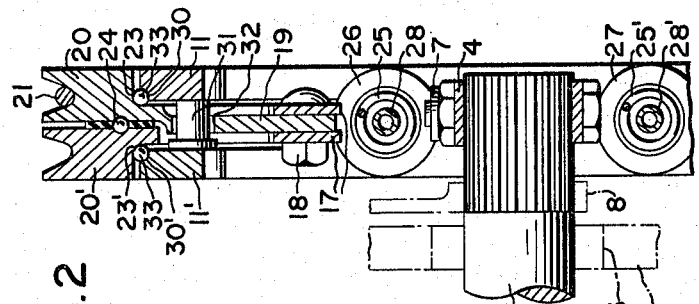
FIG. 2 is a sectional view taken along line 2—2 of FIG. 1.
Figure 3:
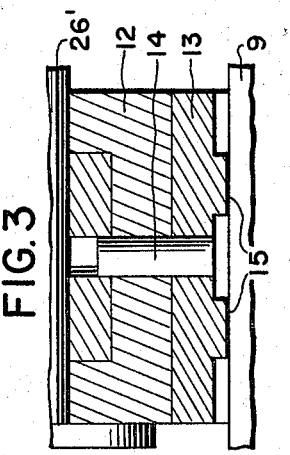
FIG. 3 is an enlarged view of the structure enclosed within the arrows 3—3 of FIG. 1.

Referring now to the drawings, the reference numeral 1 designates a supporting bracket such as an engine or airframe bracket which is carried by the aircraft or other vehicle employing the regulator. A regulator shaft or trunnion 2 is shown turnably supported as by bearing 3 on bracket 1 and is splined for a portion of its length for receiving the central hub portion 4 of a narrow substantially flat regulator body member 5. The hub portion 4 is slit or cut away at 6, and a bolt 7 compresses the split hub so as to fix the regulator body member 5 firmly upon shaft 2. An operating arm 8 is splined upon shaft 2 and is adapted to be connected for operating the controlled member such as an engine throttle or aircraft control surface.

The regulator body 5 has a forwardly projecting flat arm 9 to the forward end portion of which is secured as by bolts or screws 10 mutually spaced substantially annular ring bearing members 11 and 11' spaced radially outwardly from hub portion 4. The annular bearing members 11 and 11' are attached to and supported upon opposite sides of the arm 9 remote from hub portion 4 and are also attached at opposite points in their diameters to the opposite sides of regulator body 5 by bolts or screws 10'. Thus, the bearing members 11 and 11' are rigid with body 5 and hence with shaft 2 and operating arm 8.

A cross-head 12 extends across arm 9 and carries brake shoes 13 that, during normal regulating action of the regulator, slidingly engage the upper and lower surfaces of body arm 9. The shoes 13 are shown retained in crosshead 12 by pins 14 and are provided with mutually spaced hardened bearing pads 15 which normally have a slight clearance with respect to the hardened upper and lower surfaces of arm 9.

The upper and lower ends of cross-head 12 are pivotally connected by pins 16 and 16', links 17 and 17' and bolts 18 and 18' to radially inwardly directed lugs 19 and 19' formed on annular regulator ring sheaves 20 and 20' and extending radially inwardly between ring bearings 11 and 11'. Ring sheaves 20 and 20' carry regulator cables 21 and 21' that extend within the grooves of these sheaves and are attached thereto by use of ball connectors 22, 22'. It will be noted that ring sheaves 20 and 20' are formed with right-angled recesses 23 and 23' in their inner outside edges to accommodate bearing balls 33 therewithin. These balls are interposed between the rounded inner corners of recesses 23 and 23' and raceways 30 and 30' provided in the peripheries of annular ring bearing members 11 and 11'. Thus, the annular ring bearing members 11 and 11' which surround the shaft 2, body 5 and cross-head 12 serve as combined radial and thrust bearings for the annular ring sheaves 20 and 20' retaining these sheaves in side-by-side relation. A thrust spacer bearing 24 is interposed between the annular ring sheaves 20, 20', and these sheaves have ball bearing grooves to accommodate the bearing 24, whereby sheaves 20 and 20' are independently rotatable. Pins 31 carried by ring bearing members 11 and 11' extend through slots 32, 32' of lugs 19, 19' to engage and stiffen bearing members 11 and 11' so as to prevent the separation of sheaves 20, 20' in use.

Rig load or regulator compression springs 25 and 25' extend above and below the regulator body 5 within the confines of ring bearing members 11 and 11' and have their rear ends mounted in cup sockets 26 and 27 carried by bearing members 11 and 11' and their forward ends mounted in similar cup sockets 26' and 27' that extend through and are carried by cross-head 12. Spring guide rods 28 and 28' within regulator springs 25 and 25' serve to guide these springs in use.

Figure 1:
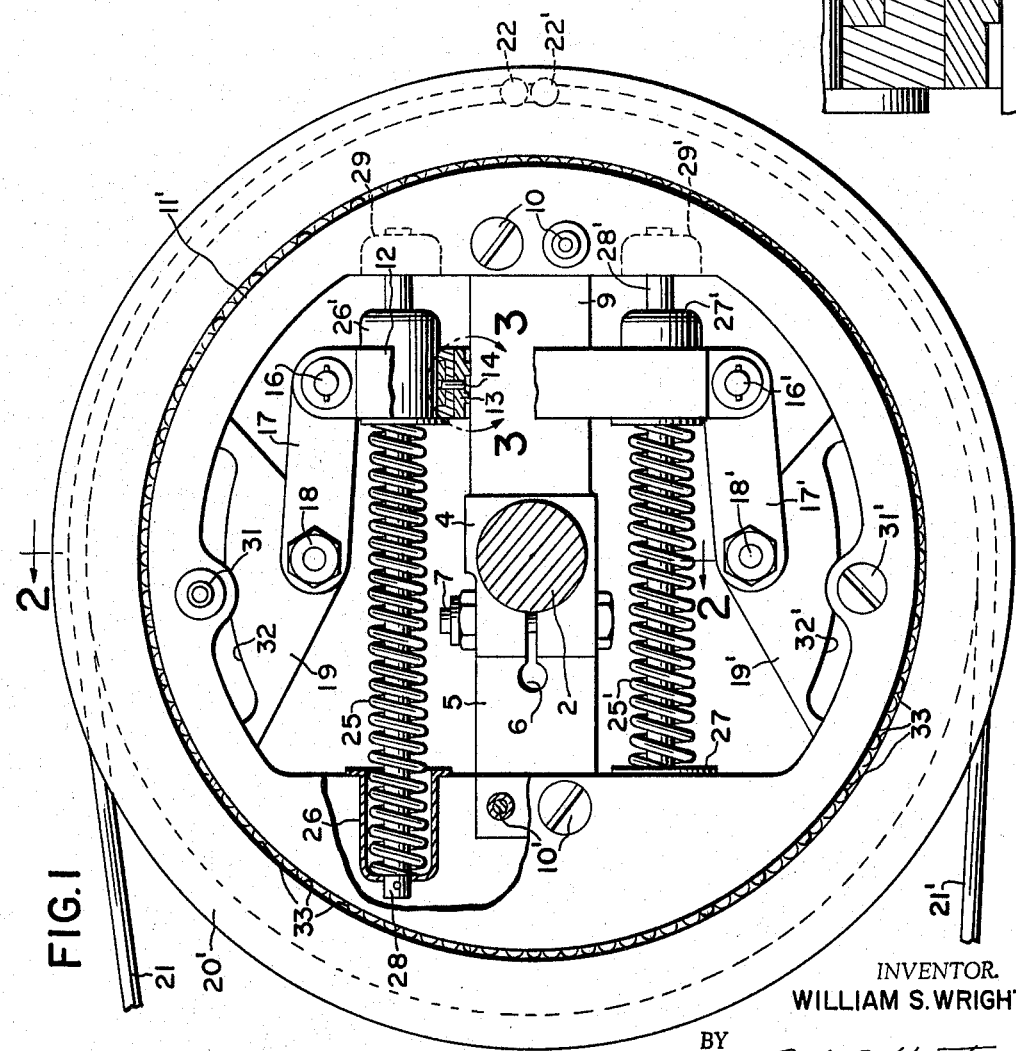
FIG. 1 is a view in side elevation of the novel regulator of this invention with parts broken away.

In use, during the normal period when a control load is not being applied to the system, the regulator compression springs 25 and 25' press forwardly against the cups 26' and 27' tending to move cross-head 12 to the right as viewed in FIG. 1 so that the connected links 17 and 17' tend to turn annular ring sheave 20 clockwise and annular ring sheave 20' counter-clockwise, thereby applying the desired rig load on the cables 21 and 21', the tension in these cables being predetermined by the tension of springs 25 and 25'. The forward movement of cups 26' and 27' is limited by sockets 29 and 29' provided in the ring bearing members 11 and 11'. During this regulating action, the brake shoes 13 carried by the cross-head 12 slide freely over the upper and lower surfaces of body arm 9. As the cables 21 and 21' tend to lengthen and shorten due to temperature changes, airframe flexure, etc., the springs 25 and 25' automatically yield and expand as the case may be to keep the cables under substantially uniform rig load.

As soon as a control movement is applied to the cables, for example should cable 21 be pulled toward the left as viewed in FIG. 1 due to operation of an engine throttle lever or steering wheel for example, this cable will carry more tension than cable 21', with the result that stress in link 17 will exceed that in link 17', resulting in the slight canting or rocking of the cross-head 12 counter-clockwise as viewed in FIG. 1, thereby locking brake shoes 13 upon regulator body arm 9 and preventing any further tension regulation by springs 25 and 25' while locking the system so that the annular ring sheaves 20 and 20' will turn together as a unit and effect rotation of cross-head 12 and body 5, thereby actuating arm 8 and the controlled member therefrom in one direction. A regulating force applied to cable 21' will similarly cause the controlled member to move in the opposite direction. It will be noted that when a regulating force is applied to either cable the load or forces thus created are transmitted solely by the regulator body 5 to the shaft 2, thereby eliminating dual supporting structures and bearings heretofore found necessary in prior art regulators, whereby the present regulator is greatly simplified and far more compact than such prior regulators.

It will be further noted that, since all the regulator parts including ring bearing members 11 and 11', springs 25, 25', cross-head 12, etc., are all within the confines of the closely adjacent annular ring sheaves 20 and 20', a very compact regulator is produced, allowing a plurality of regulators to be set up in a small space. Also, since ring bearings 23 and 24 are disposed radially outwardly at the annular sheaves 20 and 20', there is no possibility for these sheaves to rock transversely of the shaft 2 which tends to take place with ordinary bearings located on the shaft 2 itself. Thus, bearings 23 and 24 do not have to be machined so accurately as in the case of shaft bearings which also take up additional space.

It has been found in use that the ring sheaves 20 and 20' being of relatively small cross-section are somewhat flexible and hence do not tend to bind or build up friction during compensating or regulating movements of the regulator. Further, since the ring sheaves 20, 20' and ring bearings 11, 11', may be made of lightweight metal such as aluminum there is a minimum of weight at the periphery of the regulator structure thus greatly reducing the amount of overhung mass and hence correspondingly reducing vibration and shock loads; in fact, the weight of the regulator of this present invention, owing to its compactness, use of but a single supporting member 5, and other novel features, is substantially half that of former regulators meeting similar specifications.

Since many changes could be made in the above construction of the novel regulator of this invention and many apparently widely different embodiments of this invention could be made without departing from the scope thereof, it is intended that all matter contained in the above description shown in the accompanying drawings shall be interpreted as illustrative and not in a limiting sense.

What is claimed is:

1. A control line regulator comprising a thin substantially flat bar-like body member having a hub portion adapted to be attached to a regulator shaft to be driven by said body member, said body member radiating outwardly on opposite sides from said shaft, a pair of slightly spaced annular ring bearings positioned radially outwardly of the regulator shaft and fixedly supported on the ends of said body member, a pair of annular ring sheaves turnably supported upon said ring bearings and adapted to receive control cables, a cross-head normally slidable along said regulator body member within the hollow interior of said ring bearings, linkage connectors connecting the ends of said cross-head to said ring sheaves and rig load compression springs interposed between said ring bearings and said cross-head and acting through said linkage connectors for urging said ring sheaves to turn in opposite directions to maintain the cables under rig tension, the application of a control load to one of the cables connected to one of said annular ring sheaves acting through its linkage connector to tilt said cross-head and locking the same upon said regulator body member and effecting a control movement of said regulator, said regulator body member, said cross-head and said rig load compression springs all being contained within the confines of said ring cable sheaves, thereby constituting a compact narrow lightweight regulator.

2. A lightweight compact control line regulator as defined in claim 1 wherein said cross-head carries hardened brake shoes for locking upon said regulator body member during a control operation, thereby causing said regulator body member to move with the actuated cable, said linkage connectors extending from the ends of said cross-head in between said ring bearings to said ring sheaves for actuating said cross-head, said ring sheaves being antifrictionally mounted on said ring bearings.

References Cited by the Examiner
UNITED STATES PATENTS

| | | | |
|---|---|---|---|
| 2,436,768 | 2/1948 | Griffith et al. | 308—174 |
| 2,585,358 | 2/1952 | Weber | 74—501.5 |
| 2,841,030 | 7/1958 | Wrighton | 74—501.5 |

FRED C. MATTERN, Jr., *Primary Examiner.*

BROUGHTON G. DURHAM, *Examiner.*

C. F. GREEN, *Assistant Examiner.*